United States Patent Office 3,467,607
Patented Sept. 16, 1969

3,467,607
POLYURETHANE FOAMS BASED ON A
HALOGENATED QUASI-PREPOLYMER
William C. Kuryla and Robert J. Knopf, St. Albans, W.
Va., assignors to Union Carbide Corporation, a corporation of New York
No Drawing. Filed Jan. 10, 1967, Ser. No. 608,286
Int. Cl. C08g 22/48, 22/28
U.S. Cl. 260—2.5                                      10 Claims

ABSTRACT OF THE DISCLOSURE

This invention relates to halogen containing quasi-prepolymers and to urethane polymers produced therewith. The halogen containing quasi-prepolymers are produced by the reaction of an organic polyisocyanate having an average isocyanato functionality in excess of 2.25 and a monofunctional halogen containing alcohol, thiol or amine. The quasi-prepolymer has a lower isocyanato functionality than that of the starting organic polyisocyanate, but it is at least 2. Polyurethane foams made from the quasi-prepolymers prevent excessive pressure build-up in foam-filled laminated structures.

---

In the rigid urethane foam technology several major problems exist that present difficulties in the large scale use of rigid foams in certain applications, for instance construction and transportation. Two of the major problems present in these applications are the flammability characteristics of the finished urethane foams and the excessive pressures generated in the panels by the foam producing reaction.

The flammability problem has been alleviated to some extent by the inclusion in the reaction mixture of certain known phosphorus or halogen containing compounds which may or may not chemically react with the other reactants present in the reaction mixture. The use of such combinations is well known in the urethane foam field and has improved the self-extinguishing properties of the foams.

The generation of high molding pressures by the expanding foam systems during the reaction is a serious problem in high-rise molding applications such as are encountered in constructing laminated structures for the building and transportation industries. In the high-rise molding applications a relatively thin foam having a great height is produced and the formation of such molded urethane foams is a problem; not only must the foam rise a relatively great distance, but at the same time it must not generate pressure to such an extent that the panels show a bulge.

In the building industry the problem can be resolved to some extent by providing satisfactory jigging for the panels that are to contain the foam. This is also true when transportation vehicle panels are concerned. However, such jigging is quite expensive and it must be constructed to fit the particular sized panel that is in production. Further, additional expense is incurred in fitting the jigging to each panel prior to foaming therein since each panel must be individually braced with the jigging equipment before the urethane foam is produced therein. The necessity for using jigging thus makes it difficult and expensive if one wishes to insulate the walls of a previously constructed house or a vehicle. Further, when a large section is to be treated difficulties are encountered in providing satisfactory jigging for the large area involved.

A solution to these problems would be the use of foam systems that would not generate high pressures during the foaming reaction; however, heretofore such systems have not been available. It has now been found that certain compositions can be produced that do not generate high molding pressures which at the same time provide some protection in foam flammability and fire retardance. This invention is concerned with quasi-prepolymers that generate low molding pressures without sacrificing fire-retardancy properties of the foams produced therewith.

The quasi-prepolymers of this invention are the products produced by the reaction of certain organic polyisocyanates with certain monofunctional halogen containing alcohols, or halogen containing thiols, or halogen containing amines. The halogen containing quasi-prepolymers can be produced directly by the reaction of the polyisocyanate with the monofunctional halogen compound. Alternatively the halogen containing quasi-prepolymers can be produced by halogenating the halogen-free quasi-prepolymer, as will be shown hereinafter. The manner of preparation of the halogen containing quasi-prepolymer is immaterial.

The polyisocyanates which are useful in preparing the quasi-prepolymers of this invention embrace those materials whose average isocyanato functionalities exceed 2.25 and preferably are at least 2.5. The average functionality can be from 2.25 to about 3.1 or higher. The isocyanato functions can be aromatic, aliphatic, or mixtures thereof. Included in this group are known compositions such as the triphenylmethane triisocyanates and substituted counterparts thereof, phosphoryl triisocyanates, the various triisocyanato-triphenyl phosphates, the aniline-formaldehyde polyisocyanates and their substituted counterparts such as the toluidine and the anisidine-formaldehyde polyisocyanates, the various mixtures of di-, tri-, and tetraisocyanato diphenyl ethers, and sulfides and disulfides, the 2,4,6-triisocyanatobenzenes, toluenes and ethylbenzenes, the various mixtures of di-, tri- and tetraisocyanatonaphthalenes, the various tri- and tetraisocyanatomethyl diphenylethers, and various mixtures of the di-, tri-, and tetraisocyanatodiphenylmethanes and diphenylethanes, to mention but a few of the many known polyisocyanates. It is to be understood that polyisocyanates having isocyanato functionalities substantially greater than 2.25 can be diluted with either refined or crude diisocyanates such as the various diisocyanatodiphenyl-methanes, the diisocyanatodiphenyl ethers, the m- and p-xylylenediisocyanates, the ditoluidine diisocyanates and dianisidine diisocyanates, dimer acid diisocyanates, the tolylene diisocyanates, the diisocyanatoxylenes and the ester-derived compositions such as the bis(isocyanatoalkyl) carbonates, fumarates, succinates, 4-cyclohexene-1,2-dicarboxylates and the 1,4,5,6,7,7-hexachloro - 5 - norbornene - 1,2-dicarboxylates, etc. to form mixtures whose average isocyanato functionality exceeds 2.25 and which can therefore be utilized to prepare the quasi-prepolymers of this invention.

A particularly preferred class of polyisocyanates for use in this invention is the aniline-formaldehyde polyaromatic type product which is produced by phosgenation of the polyamine obtained by the acid-catalyzed condensation of aniline with formaldehyde. Materials of this type are available commercially under such trade names as PAPI, AFPI, Mondur MR, and Carwinate 390P. These products are low viscosity (50–500 cps. at 25° C.) liquids having average isocyanato functionalities in the range of about 2.25 to about 3, or higher, depending upon the specific aniline to formaldehyde molar ratio used in the polyamine preparation. Because of their high average functionalities and their low viscosities, these materials are ideally suited for quasi-propolymer preparations of the type with which this invention is concerned. Another preferred type of polyisocyanate is that resulting from the mixing of polyfunctional materials such as the aniline-formaldehyde polyaromatic type described with very low viscosity diisocyanates such as crude or refined tolylene diisocyanates. In the case where a diisocyanate diluent is utilized, the quasi-prepolymer can be prepared either by the reaction of the appropriate monofunctional compound with a mixture of the isocyanates or by the reaction with one or the other of the isocyanates followed by dilution of the resulting quasi-prepolymer with the second isocyanate. The only restriction placed upon the isocyanate mixtures is, as stated earlier, that the mixtures have average isocyanato functionalities greater than 2.25.

The halogen containing monofunctional alkanols and thiols that are useful for the production of the quasi-prepolymers of this invention can be represented by the formula $$X_nRZH$$

wherein X represents a halogen atom such as chlorine, bromine or iodine; Z represents oxygen or sulfur; $n$ is an integer having a value of from 1 to about 6; and R is an organic radical free of other substituents that would react with the isocyanato group of the polyisocyanate. The R group can be alkyl containing from 1 to about 10 carbon atoms, cycloalkyl containing from 5 to about 10 ring carbon atoms, aralkyl containing from 7 to about 20 carbon atoms, alkenyl containing from 2 to about 7 carbon atoms, cycloalkenyl containing from 5 to about 10 carbon atoms, aralkenyl containing from 8 to about 20 carbon atoms, heterocyclyl containing from about 5 to about 15 ring atoms wherein the hetero atom can be oxygen, nitrogen, sulfur or phosphorus, or polycyclyl containing from 5 to about 20 atoms in the polycyclic ring nucleus. The R group can be substituted with connective radicals such as oxo, thio, carbonyloxy, sulfonyl, sulfoxy, amido, and the like as well as with other substituent groups such as ether, sulfide, ester, nitrile, sulfone, amide, ketone, aldehyde, nitro, sulfoxide, acetal, orthoester, and the like. Also useful are the halogen containing phosphoric acids derivatives.

Among the suitable halogen containing monofunctional alkanols and alkathiols one can mention ethylene chlorohydrin, ethylene bromohydrin, ethylene iodohydrin, propylene chlorohydrin, butylene chlorohydrins, 2,3-dibromopropanol, glycerol dichlorohydrin, 2,3,4,5,6-pentachlorophenoxy ethanol, 1,3,4,5,6,7,7-hexachloro-norborn-5-ene-2-methanol, 1,2-cyclohexane bromohydrin, hydroxyethyl chlorobenzoate, hydroxyethyl iodobenzoate, hydroxyethyl trichlorobenzoate, hydroxypropyldichlorobenzoate, hydroxypropyl pentachlorobenzoate, hydroxypropyl tetrabromobenzoate, hydroxybutyl trichlorobenzoate, 2-chloroethyl-2'-hydroxyethyl ether, 2,3-dibromopropyl-3-hydroxypropyl ether, 3-chloro-2-buten-1-ol, 2,3-dichloro-3-phenyl propanol, 2-chlorobenzyl alcohol, 2,4-dichlorobenzyl alcohol, 2,4,6-trichlorobenzyl alcohols, 2-chloromethyl-5-hydroxymethylnorbornane, 2-chloroethyl-5-hydroxypropylnorbornane, 2,3-bis(bromomethyl)-5-hydroxyethylnorbornane, chlorocyclopentanol, dichlorocyclopentanol, dibromocyclopentanol, chlorocyclohexanol, iodocyclohexanol, dimethylchlorocyclopentanol, chlorocyclopentylmethanol, chlorocyclopentenol, dichlorodicyclopentenol, chlorocyclopentadienol, bis (2-ethylhexyl)-3-chloro-2 hydroxypropyl phosphate, bis (2,4-dichlorophenyl)-2-hydroxypropyl dithiophosphate, diethyl 3-chloro-2-hydroxypropyl phosphite, 2-bromo-3-chloro-1-propanol, 4-chlorobutanethiol, 2 - (2,3,4,5,6 - pentachlorothiophenoxy) ethanethiol, 6-bromohexanethiol, 1,3,4,5,6,7,7-hexachloro-2-thiomethyl-norborn-5-ene, 3-bromopropanethiol, 2-bromomethyl-5-mercaptonorbornane, and the like.

The halogen containing monofunctional amines that are useful for the production of the quasi-prepolymers of this invention are the primary and secondary aromatic amines of the formula

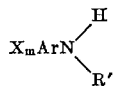

wherein X represents a halogen atom such as chlorine, bromine or iodine, $m$ is an integer having a value of from 3 to about 9 with the proviso that at least two of the halogen atoms must occupy positions ortho or para to the amine function, Ar is an aryl radical containing from 6 to about 18 carbon atoms such as phenyl, naphthyl, anthranyl, phenanthranyl, and the like, and R' can be hydrogen, alkyl containing from 1 to about 10 carbon atoms, cycloalkyl containing from 5 to about 10 carbon atoms, aryl containing from 6 to about 18 carbon atoms, aralkyl containing from 7 to about 20 carbon atoms, alkaryl containing from 7 to about 20 carbon atoms, alkenyl containing from 2 to about 7 carbon atoms, cycloalkenyl containing from 5 to about 10 carbon atoms, aralkenyl containing from 8 to about 20 carbon atoms, heterocyclyl containing from about 5 to about 15 ring carbon atoms wherein the hetero atom is oxygen, sulfur or phosphorus, or polycyclyl containing from 5 to about 20 atoms in the polycyclic ring nucleus. The amines can also be substituted in the same manner as set forth supra for the alkanols.

Suitable halogen containing monofunctional amines that one can mention are 2,4,6-tribromoaniline, pentachloroaniline, 2,4,5-trichloroaniline, pentachloro-N-methylaniline, N-(B-cyanoethyl) - 2,4 - dibromonaphthalene, 2,4-diiodo-6-methyl-N-allylaniline, 2,4,2',4'-tetrachlorodiphenylamine, N-methyl - N' - bis(2,4,6-tribromophenyl) ethylenediamine, 4-ethyl-2,6-diiodoaniline, 2,2',6,6'-tetrabromo-4-N-methylamino-4' - methoxyl diphenylmethane, 2,4,2',4'-tetrabromodiphenylamine, 2 - chloro-4-bromoanthracene, N-cyclohexyl-2,3,4,5,6-pentachloroaniline, N-(3,4-dichlorocyclopentyl)-2,4-dibromoaniline, N - pentachlorophenyl-N'-bis (2-cyanoethyl)-aniline, 4-amino-2,6-dichloro-4'-bromodiphenyl sulfone, and the like.

The suitable alkanols, alkathiols and amines must be free of functional groups which either react directly with isocyanates or catalyze various isocyanate-destroying reactions such as dimerization, trimerization, carbodiimide formation, and the like. Among such deleterious groups are the carboxylic acid functions, epoxides, carboxamides, hydrazines, phenols, dialkyl phosphites, and the primary, secondary and tertiary amines with the exception of those particular halogenated aromatic amines defined above of the formula

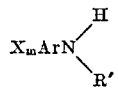

The preparation of quasi-prepolymers is well known in the art and the process for producing the novel quasi-prepolymers of this invention are not considered patentable herein; any of the known procedures can be used. In a typical procedure the organic polyisocyanate is charged to a reaction vessel and the halogen-containing monofunctional alcohol or thiol or amine is added thereto at ambient temperature while the temperature is maintained at about 10° C. to about 140° C. In another embodiment the organic polyisocyanate is heated to about 50° C. to 125° C., preferably about 65° C. to about 90° C., and the halogen-containing monofunctional compound is added thereto while cooling to maintain a reasonably constant temperature throughout the addition period.

The amount of halogen-containing monofunctional compound that is reacted with the organic polyisocyanate will vary depending upon the initial average functionality of the polyisocyanate and the final average functionality desired in the quasi-prepolymer produced. As is obvious the average isocyanato functionality value of the quasi-prepolymer will be lower than the value of the polyisocyanate. However, the quasi-prepolymers have a final average functionality of at least about 2 or higher to ensure the production of rigid foams having the desired physical properties.

The amount of halogen-containing compound reacted with the polyisocyanate is readily calculable once the average functionality of the polyisocyanate is known. Thus, for example, if the initial average functionality of the polyisocyanate is 2.5 and one wishes to produce a quasi-prepolymer having a final average functionality of about 2, one will react one-half mole of halogen-containing compound with each mole of organic polyisocyanate initially charged. A simple equation that can be used to determine the molar amount of halogen-containing compound per mole of organic polyisocyanate is as follows:

$$A - B = C$$

where:

A = initial average functionality of the organic polyisocyanate
B = final average functionality desired for the quasi-prepolymer
C = moles of halogen-containing compound to be reacted per mole of organic polyisocyanate charged.

As mentioned above, the quasi-prepolymers are useful in the production of urethane polymers which can be cellular or non-cellular. These quasi-prepolymers can be used either alone or in combination with any of the well known polyisocyanates; illustrative of which are 2,4-tolylene diisocyanate, 2,6-tolylene diisocyanate, the phenylene diisocyanates, the naphthalene diisocyanates, hexamethylene diisocyanate, 1,2,4-tolylene triisocyanate 1,4-cyclohexylene diisocyanate, 1,3-cyclopentylene diisocyanates, and the like, as well as mixtures thereof.

In producing the urethane foams the quasi-prepolymers of this reaction are reacted with compounds having a plurality of active hydrogens as determined by the Zerewitnoff test. The compound having a plurality of active hydrogens can be a polyhydroxy compound such as glycols, triols, hexols, octols, polyesterpolyols, polyetherpolyol, and the like. These compounds are well known in the art and many are available commercially. Illustrative thereof are the following classes of compositions:

(a) Polyoxyalkylene polyols including alkylene oxide adducts of, for example, water, ethylene glycol, diethylene glycol, propylene glycol, dipropylene glycol, glycerol, 1,2,6-hexanetriol, 1,1,1-trimethylolethane, 1,1,1-trimethylolpropane, pentaerythritol, sorbitol, sucrose, lactose, alpha-methylglucoside, alpha-hydroxyalkylglucoside, ammonia, triethanolamine, triisopropanolamine, ethylenediamine, diethylenetriamine, novolac resins, phosphoric acid, benzenephosphonic acid, polyphosphoric acids such as tripolyphosphoric acid and tetrapolyphosphoric acid, phenol-amine-formaldehyde ternary condensation products, aniline-formaldehyde condensation products, and the like, are useful.

The alkylene oxides employed in producing polyoxyalkylene polyols normally have from 2 to 4 carbon atoms. Propylene oxide and mixtures of propylene oxide with ethylene oxide are preferred.

(b) Polyesters of polyhydric alcohol and polycarboxylic acid such as those prepared from an excess of ethylene glycol, propylene glycol, 1,1,1-trimethylolpropane, glycerol, or the like reacted with phthalic acid, adipic acid, and the like, are useful polyols.

(c) Lactone polyols prepared by reacting a lactone such as epsilon-caprolactone or a mixture of epsilon-caprolactone and an alkylene oxide with a polyfunctional initiator such as a polyhydric alcohol, an amine, or an aminoalcohol, are also useful.

(d) Phosphorus-containing derivatives such as tris(dipropylene) glycol phosphite and other phosphites are useful in urethane foams.

The amount of quasi-prepolymer employed is such that the total isocyanato (—NCO) equivalent to total active hydrogen equivalent is from about 1:1 to about 1.4:1, preferably from about 1.05:1 to about 1.2:1.

In producing the urethane foams of this invention a blowing agent which is vaporized by the exothermic reaction is added. The blowing agents are known and include the halogen-substituted aliphatic hydrocarbons which vaporize at or below the temperature of the foaming mass. Illustrative are, for example, trichloromonofluoromethane,
dichlorodifluoromethane,
dichloromonofluoromethane,
dichloromethane,
trichloromethane,
bromotrifluoromethane,
chlorodifluoromethane,
chloromethane,
1,1-dichloro-1-fluoromethane,
1,1-difluoro-1,2,2-trichloroethane,
chloropentafluoroethane,
1-chloro-1-fluoroethane,
1-chloro-2-fluoroethane,
1,1,2-trichloro-1,2,2-trifluoroethane,
2-chloro-1,1,1,2,3,3,4,4-nonafluorobutane,
hexafluorocyclobutene, and
octafluorocyclobutane.

Other useful blowing agents include low-boiling hydrocarbons such as butane, pentane, hexane, cyclohexane, and the like. Many other compounds easily volatilized by the exotherm of the isocyanate-reactive hydrogen reaction also can be employed. A further class of blowing agents includes thermally-unstable compounds which liberate gases upon heating, such as N,N'-dimethyl-dinitroso-terephthalamide.

The amount of blowing agent used will vary with the density desired in the foamed product. In general it may be stated that for 100 grams of reaction mixture containing an average isocyanate/reactive hydrogen ratio of about 1:1, about 0.005 to 0.3 mole of gas are used to provide densities ranging from 30 to 1 pound per cubic foot, respectively.

Catalysts can be employed in the reaction mixture for accelerating the isocyanate-reactive hydrogen reaction. Such catalysts include a wide variety of compounds. Among the most useful are the tertiary amines and the organic tin compounds. Specific illustrative tertiary amines include N-methylmorpholine, N-ethylmorpholine, N,N,N',N'-tetramethyl-1,3-butanediamine, N,N-dimethylethanolamine, 1,4 - diazabicyclo - [2.2.2]octane, bis-[2-(N,N-dimethylamino)ethyl] ether, and the like. Useful organic tin compounds include stannous octoate, stannous acetate, stannous oleate, dibutyltin diacetate, dibutyltin dilaurate, and the like. Many combinations of catalysts can be employed, for instance, it is useful to employ one or two tertiary amines in combination with stannous octoate (in making flexible foams) or dibutyltin dilaurate (in making rigid foams). The catalyst is employed in catalytic amounts such as from about 0.05 weight percent to about 6 weight percent, based on weight of polyol.

When producing urethane foams, it is useful, in many cases, to employ a surfactant which serves as a stabilizer in making flexible foams and as a cell size regulator in making rigid foams. Polysiloxane-polyoxyalkylene block copolymers are useful surfactants for this purpose. Among the polysiloxane-polyoxyalkylene block copolymers that are useful are those that are disclosed in U.S. Patents 2,834,748 and 2,917,480 (Bailey et al.) and 2,846,458 (Haluska). The surfactant is normally employed in amounts of from about 0.01 to about 2 weight percent, based on weight of polyol.

An excellent summary of urethane polymer chemistry and technology is found in the text by Saunders and Frisch, "Polyurethanes: Chemistry and Technology," Interscience Publishers, New York. Part I, "Chemistry," was published in 1962 and Part II, "Technology," in 1964.

The tested foams were produced by hand-foaming 8 x 8 x 6 inch buns. The buns were oven cured for 10 minutes at 70° C. and then aged for 3 days at room temperature prior to testing; the following test procedures were used:

| | |
|---|---|
| Core density | ASTM D-1622 |
| Closed cell content | ASTM D-1940-62 |
| Compressive strength | ASTM C-273 |
| Durability: | |
| (a) cold aging | ASTM D-2126B |
| (b) dry aging | ASTM D-2126E |
| (c) humid aging | ASTM D-2126F |
| Flammability | ASTM D-1692 |
| Friability | ASTM C-367 |

The pressure generated during the foaming reaction was measured in pressure testing molds having inside dimensions 18 inches wide, 2.5 inches thick, and 20 inches high. The back plate of the molds is designed to act as a rigid body; for this purpose it was constructed of 0.25 inch thick prestressed aluminum plate reinforced by welding two inch aluminum channel at six inch intervals across the entire surface of the back plate. A 2.5 inch aluminum channel was fitted around the bottom and side of the perimeter to serve as the spacer; this was attached to the back plate by hinges at the bottom. The front plate was also hinged to the spacer at the bottom. A ⅛ inch thick prestressed aluminum panel was used at the front plate to measure mold pressures in the zero to 0.8 p.s.i. range and a ¼ inch thick plate was used as the front plate to measure mold pressures ranging up to 3.8 p.s.i. or more. The mold when closed is held together by clamps positioned at the bottom and side. Strain gauges were affixed to the front plate and connected to a calibrated Foxboro strip chart recorder. Each mold was separately calibrated to obtain a calibration curve of chart deflection versus pressure in p.s.i. The calibration was accomplished by sealing the mold with a gasket and then pressurizing with air; the air pressure was increased in small increments up to the desired maximum pressure while noting the chart deflection on the record.

The following examples further serve to illustrate the invention. The compositions of various starting materials used therein are as follows:

Polyol A.—A polyol made by the addition of a mixture of 1,2-propylene oxide and ethylene oxide (about 80:20) to sucrose, to an average hydroxyl number of about 450.

Polyol B.—A polyol made by the addition of a mixture of 1,2-propylene oxide and ethylene oxide to a phenol/aniline/formaldehyde condensation product, to an average hydroxyl number of about 320.

Emulsifier A.—A composition of the average formula

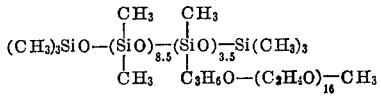

Example 1

A dry nitrogen purged reaction flask was equipped with a stirrer, thermometer, and dropping funnel and 2,328 grams of polymethylene polyphenylisocyanate having an average viscosity of about 250 cps. and an average free isocyanate content of about 31 percent, which is equivalent to an average isocyanato functionality of about 2.75, was added and heated to 75° C. a 112 grams portion of 2,3-dibromo-1-propanol was added and the reaction mixture was stirred for about one-half hour at 75–78° C. A second 126 grams portion of 2,3-dibromo-1-propanol was added and this was followed by a final 125 grams of 2,3-dibromo-1-propanol a half-hour later. The reaction mixture was stirred at 75–77° C. for an additional period of about 1.75 hours. The quasi-prepolymer produced had an average molecular weight of about 470; a viscosity at 25° C. of 2,500 cps. and an average free isocyanate content of 24.2 percent, which is equivalent to an average isocyanato functionality of about 2.45; this quasi-prepolymer was used below.

A formulation, I, was prepared consisting of the following components:

| | Parts |
|---|---|
| Polyol A | 80 |
| (C₂H₅O)₂PCH₂N(C₂H₄OH)₂ (O) | 20 |
| Fluorotrichloromethane | 36 |
| Dimethylethanolamine | 1 |
| Emulsifier A | 1.5 |
| Quasi-prepolymer | 149 |

A control formulation, II, was prepared consisting of the following components:

| | Parts |
|---|---|
| Polyol A | 80 |
| (C₂H₅O)₂PCH₂N(C₂H₄OH)₂ (O) | 20 |
| Fluorotrichloromethane | 36 |
| Dimethylethanolamine | 1 |
| Emulsifier A | 1.8 |
| Polymethylene polyphenylisocyanate | 117.2 |

The amount of isocyanate-containing compound used was an amount calculated to give a five percent excess of the isocyanate group.

The formulations were stirred and poured into separate pressure testing molds, which had been preheated to 50° C., as soon as they started to foam. The maximum pressure generated during the foaming reaction was measured as previously described; the other properties were determined on the foam using the indicated ASTM test procedures. This same technique was employed in each of the following examples.

The physical properties of the foams produced were as follows:

| Formulation | I | II |
|---|---|---|
| Cream time, sec | 45 | 55 |
| Rise time, sec | 350 | 330 |
| Tack-free time, sec | 330 | 270 |
| Density, lb./cm. ft | 2.52 | 2.25 |
| Closed cell content, percent | 93 | 91 |
| Pressure generated, p.s.i./time min | 0.52/11 | 1.31/7.5 |
| Flammability, inch | 0.6 | 1.0 |
| Friability loss after 20 minutes, wt. percent | 25.5 | 58.5 |

The results show that the formulation containing the quasi-prepolymer of this invention generated a pressure that was only about 40 percent of the pressure generated by the control formulation. This is a critical and significant difference. Also significant are the improvements shown in the flammability and friability properties of the foam.

Example 2

A quasi-prepolymer was produced in a manner similar to that described in Example 1. The flash was charged with 3,720 grams of polymethylene polyphenylisocyanate having an average free isocyanate content of 30.3 percent, which is equivalent to an average isocyanato functionality of about 2.75, and about 60 grams of Emulsifier A and then three portions of 162 grams, 155 grams and 103 grams, respectively, of 1,4,5,6,7,7-hexachloro-5-norbornene-2-methanol were added at half-hour intervals at a temperature of from about 74–76°C. The reaction mixture was stirred an additional 1.5 hours at 75–79° C. The quasi-prepolymer produced had a viscosity at 25° C. of 2,138 cps. and an average free isocyanate content of 25.8 percent which is equivalent to an average isocyanato functionality of about 2.62; this quasi-prepolymer was used below:

A formulation, I, was prepared consisting of the following components:

|  | Parts |
|---|---|
| Polyol A | 80 |
| $(C_2H_5O)_2\underset{\underset{O}{\|}}{P}CH_2N(C_2H_4OH)_2$ | 20 |
| Fluorotrichloromethane | 36 |
| Dimethylethanolamine | 1 |
| Quasi-prepolymer | 140 |

A control formulation, II, was prepared consisting of the following components:

|  | Parts |
|---|---|
| Polyol A | 80 |
| $(C_2HO_5)_2\underset{\underset{O}{\|}}{P}CH_2N(C_2H_4OH)_2$ | 20 |
| Fluorotrichloromethane | 36 |
| Dimethylethanolamine | 1 |
| Polymethylene polyphenylisocyanate | 117.2 |
| Emulsifier A | 1.8 |

The amount of isocyanate-containing compound used was an amount calculated to give a five percent excess of the isocyanate group.

The formulations were foamed as described in Example 1. The foams produced had the following physical properties:

| Formulation | I | II |
|---|---|---|
| Cream time, sec | 65 | 55 |
| Rise time, sec | 330 | 330 |
| Tack-free time, sec | 260 | 270 |
| Density, lb./cu. ft | 2.28 | 2.25 |
| Pressure generated, p.s.i./time min | 0.82/8 | 1.3/7.5 |
| Flammability, inch | 0.75 | 1.0 |
| Friability loss after 20 minutes, wt. percent | 37.3 | 58.5 |

The improvements obtained are obvious from the data and significant in amount.

Example 3

A quasi-prepolymer was prepared in a manner similar to that described in Example 1 except that the monofunctional alcohol was added gradually over a period of 50 minutes rather than in large incremental portions; the temperature was maintained between 75°–82° C. The flask was charged with 3,590 grams of the same polymethylene polyphenylisocyanate used in Example 2 and 50 grams of Emulsifier A and 360 grams of ethylene chlorohydrin was gradually added. Thereafter, the reaction mixture was stirred for 1.5 hours. The quasi-prepolymer produced had a viscosity at 25° C. of 6,500 cps. and an average free isocyanate content of 22.7 percent, which is equivalent to an average isocyanato functionality of about 2.27; this quasi-prepolymer was used below.

A formulation, I, was prepared consisting of the following components:

|  | Parts |
|---|---|
| Polyol A | 80 |
| $(C_2H_5O)_2\underset{\underset{O}{\|}}{P}CH_2N(C_2H_4OH)_2$ | 20 |
| Fluorotrichloromethane | 36 |
| Dimethylethanolamine | 1 |
| Quasi-prepolymer | 159 |

A control formulation, II, was prepared consisting of the following components:

|  | Parts |
|---|---|
| Polyol A | 80 |
| $(C_2H_5O)_2\underset{\underset{O}{\|}}{P}CH_2N(C_2H_4OH)_2$ | 20 |
| Fluorotrichloromethane | 36 |
| Dimethylethanolamine | 1 |
| Polymethylene polyphenylisocyanate | 117.2 |
| Emulsifier A | 1.8 |

The amount of isocyanate-containing compound used was an amount calculated to give a five percent excess of the isocyanate group.

The formulations were foamed as described in Example 1. The foams produced had the following physical properties:

| Formulation | I | II |
|---|---|---|
| Cream time, sec | 45 | 55 |
| Rise time, sec | 430 | 330 |
| Tack-free time, sec | 280 | 270 |
| Density, lb./cu. ft | 2.58 | 2.25 |
| Pressure generated, p.s.i./time min | 0.78/11 | 1.3/7.5 |
| Flammability, inch | 0.9 | 1.0 |
| Friability loss after 20 minutes, wt. percent | 35.4 | 58.5 |

The data clearly shows significant improvements in the flammability and friability properties and in the decrease in the pressure generated during foaming.

Example 4

A quasi-prepolymer was produced in a manner similar to that described in Example 3. The flask was charged with 3,794 grams of the same polymethylene polyphenylisocyanate and 57.4 grams of Emulsifier A and 348.6 grams of 2-bromoethanol were gradually added over a one hour period at 75–80° C. The reaction mixture was stirred for another 1.5 hours. The quasi-prepolymer produced had a viscosity at 25° C. of 3,325 cps. and an average free isocyanate content of 24.85 percent, which is equivalent to an average isocyanato functionality of about 2.47; this quasi-prepolymer was used below.

A formulation I, was prepared and foamed as in Example 1. The formulation consisted of the following components:

|  | Parts |
|---|---|
| Polyol A | 80 |
| $(C_2H_5O)_2\underset{\underset{O}{\|}}{P}CH_2N(C_2H_4OH)_2$ | 20 |
| Fluorotrichloromethane | 36 |
| Dimethylethanolamine | 1 |
| Quasi-prepolymer | 145 |

As control formulation, II, the control foam of Example 3 was used. The properties of the foams are set forth below:

| Formulation | I | II |
|---|---|---|
| Cream time, sec | 65 | 55 |
| Rise time, sec | 660 | 330 |
| Tack-free time, sec | 450 | 270 |
| Density, lb./cu. ft | 2.40 | 2.25 |
| Pressure generated, p.s.i./time min | 0.36/14.5 | 1.3/7.5 |
| Flammability, inch | 0.5 | 1.0 |

The data shows the significant difference observed in the pressure generated during the foaming between the formulation containing the quasi-prepolymer of the instant invention and the formulation employing a conventionla polyol. Also evident is the significant improvement achieved in flammability properties of the foam.

Example 5

A quasi-prepolymer is produced in a manner similar to that described in Example 1 by the reaction of a mixture of 2,332 grams of the same polymethylene polyphenylisocyanate used in Example 2, 35.5 grams of Emulsifier A and 332.6 grams of 2,3-dibromo-1-propanol added in two aliquots of 155 grams and 177.6 grams. The reaction is carried out at 75°–78° C. for a total time period of 2.5 hours. The quasi-prepolymer produced has a viscosity at 25° C. of 3,375 cps. and a free isocyanate content of 24.2 percent, which is equivalent to an isocyanato functionality of about 2.50. The quasi-prepolymer is used to produce urethane foam by conventional foaming processes.

Example 6

A quasi-prepolymer is produced in a manner similar to that described in Example 3 by the reaction of a mixture of 1,890 grams of residue tolylene diisocyanate, 1,861 grams of the same polymethylene polyphenylisocyanate used in Example 2, 29 grams of Emulsifier A and 420 grams of ethylene chlorohydrin. The average isocyanato functionality of the mixture of isocyanates used is about 2.35. The ethylene chlorohydrin is added gradually over a period of one hour and ten minutes at a temperature range of 72°–81° C. After all of the ethylene chlorohydrin has been added the reaction mixture is stirred 1.5 hours at 77°–80° C. The quasi-prepolymer produced has a viscosity at 25° C. of 1,575 cps. and a free isocyanate content of 26.0 percent, which is equivalent to an isocyanate functionality of about 2.0. The quasi-prepolymer is used to produce urethane foam by conventional foaming procedures.

A series of quasi-prepolymers was produced in which the amount of halogen-containing monofunctional alcohol was varied. The reaction was carried out by adding the specified amount of 2,3-dibromo-propanol to a commercial polymethylene polyphenylisocyanate, that had an average free isocyanate content of 31.9 percent and an isocyanato functionality of about 2.35, at a temperature of from about 75°–80° C. over a period of from 20–30 minutes and then continuing the reaction for another 1.5 hours at said temperature. The details are set forth below:

| Example | 7 | 8 | 9 |
|---|---|---|---|
| 2,3-dibromopropanol, g | 160 | 120 | 80 |
| Polymethylene, polyphenylisocyanate, g | 1,440 | 1,480 | 1,520 |
| Viscosity, cps. at 25° C | 180 | 140 | 95 |
| Isocyanate functionality | 2.19 | 2.23 | 2.27 |
| Free isocyanate content, percent | 26.7 | 28.1 | 29.3 |

The quasi-prepolymers of Examples 7 to 9 were used to produce urethane foams in the manner described in Example 1. The isocyanate compound was used in an amount to give a five percent excess of the isocyanate group. In the control the isocyanate used was the polymethylene polyphenylisocyanate used to produce the quasi-prepolymers. The formulations used and results obtained are set forth below:

|  | Control | Example 7 | Example 8 | Example 9 |
|---|---|---|---|---|
| Polyol B, parts | 100 | 100 | 100 | 100 |
| Fluorotrichloromethane, parts | 38 | 38 | 38 | 38 |
| 1,1,3,3-tetramethyl-1,3-butanediamine, parts | 1 | 1 | 1 | 1 |
| Emulsifier A, parts | 1.5 | 1.5 | 1.5 | 1.5 |
| Quasi-prepolymer, parts | | 94.6 | 89.7 | 86 |
| Polymethylene polyphenylisocyanate, parts | 79 | | | |
| Pressure generated, p.s.i | 1.30 | 1.07 | 0.93 | 0.50 |
| Flammability, inch | 3.0 | 1.4 | 1.8 | 2.1 |

Example 10

A quasi-prepolymer is produced by adding 1,903 grams of polymethylene polyphenylisocyanate having a free isocyanate functionality of about 2.75 to a reaction vessel and slowly adding thereto, at about 77° C. over a period of 70 minutes, a total of 79.1 grams of allyl alcohol. The reaction mixture is heated at 77°–79° C. for an additional 1.5 hours and a portion thereof is then removed. At this stage the prepolymer had a viscosity at 25° C. of 1,400 cps. and a free isocyanate content of 26.7 percent.

The remaining 1,586 grams of quasi-prepolymer in the flask is cooled to 30° C. and about 174 grams of bromine is added over a one-half hour period at 30°–35° C. and the reaction mixture was stirred an additional one-half hour. The brominated quasi-prepolymer produced has a viscosity at 25° C. of 8,300 cps. and a free isocyanate content of 23.8 percent, which is equivalent to an isocyanato functionality of about 2.47. The brominated quasi-prepolymer is used to produce improved urethane foam.

Example 11

A mixture of 198.2 grams of the halogen-free quasi-prepolymer produced in Example 10 and 26.4 grams of 5,5 - dimethoxy - 1,2,3,4-tetrachlorocyclopentadiene was charged to a reaction flask and stirred at 120° C. for six hours. The pressure was then reduced to 1.5 mm. of mercury and the temperature increased to about 140° C.; over a one-half hour period no material distilled over. The halogenated prepolymer produced had a viscosity at 25° C. of 18,000 cps. and a free isocyanate content of 22.7 percent, which is equivalent to an isosyanato functionality of about 2.47. This prepolymer is used to produce urethane foam.

Example 12

A quasi-prepolymer was produced in a manner similar to that described in Example 1. The flask was charged with 38.5 grams of 2,4,6-tribromoaniline and 241.5 grams of polymethylene polyphenylisocyanate having an average free isocyanate content of about 30.9 percent. The mixture was stirred under nitrogen for 2 hours at from about 50° C. to 73° C. The quasi-prepolymer was very viscous and it had an average isocyanate content of 24.29 percent. It was used to produce a urethane foam.

What is claimed is:

1. A halogen containing isocyanate terminated quasi-prepolymer produced by the reaction of an organic polyisocyanate having an initial average isocyanato functionality in excess of 2.25 with a member selected from the group consisting of monofunctional halogen containing alcohols and monofunctional halogen containing thiols of the formula $X_nRZH$ and monofunctional halogen containing amines of the formula

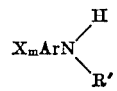

wherein X is chlorine, bromine or iodine; Z is sulfur or oxygen; $n$ is an integer having a value of from 1 to about 6; R is an organic radical free of substituents reactive with the isocyanato radical selected from the group consisting of alkyl having 1 to about 10 carbon atoms, cycloalkyl having from 5 to about 10 ring carbon atoms, aralkyl having from 7 to about 20 carbon atoms, alkenyl having from 2 to about 7 carbon atoms, cycloalkenyl having from 5 to about 10 carbon atoms, aralkenyl having from 8 to about 20 carbon atoms, heterocyclyl having from 5 to about 15 ring atoms, or polycyclyl having from 5 to about 20 atoms in the polycyclic ring nucleus; $m$ is an integer having a value of from 3 to about 9; Ar is an aryl radical containing from 6 to about 18 carbon atoms; R' is hydrogen, alkyl of from 1 to about 10 carbon atoms, cycloalkyl having from 5 to about 10 carbon atoms, aryl having from 6 to about 18 carbon atoms, aralkyl having from 7 to about 20 carbon atoms, alkaryl having from 7 to about 20 carbon atoms, alkenyl having from 2 to about 7 carbon atoms, cycloalkenyl having from 5 to about 10 carbon atoms, aralkenyl having from 8 to about 20 carbon atoms, heterocyclyl having from 5 to about 15 ring carbon atoms, or polycyclyl having from 5 to about 20 atoms in the polycyclic ring nucleus; with the proviso that at least two of the halogen atoms in said amines occupy positions ortho or para to the amine function; said quasiprepolymer having a final average isocyanato functionality lower than the average isocyanato functionality of said starting organic polyisocyanate and said quasi-prepolymer having a final average isocyanato functionality of at least 2.

2. A halogen containing isocyanate terminated quasi-prepolymer as claimed in claim 1 wherein the organic polyisocyanate is polymethylene polyphenylisocyanate having an initial isocyanato functionality of from about 2.25 to about 3.1.

3. A halogen containing isocyanate terminated quasi-prepolymer as claimed in claim 2 wherein the monofunctional halogen containing alcohol is 2,3-dibromo-1-propanol.

4. A halogen containing isocyanate terminated quasi-prepolymer as claimed in claim 2 wherein the monofunctional halogen containing alcohol is 1,4,5,6,7,7-hexachloro-5-norbornene-2-methanol.

5. A halogen containing isocyanate terminated quasi-prepolymer as claimed in claim 2 wherein the monofunctional halogen containing alcohol is ethylene chlorohydrin.

6. A urethane polymer foam consisting essentially of the resin produced by the catalytic reaction in the presence of a blowing agent of the quasi-prepolymer claimed in claim 1 and a compound having a plurality of active hydrogen atoms as determined by the Zerewitnoff test.

7. A urethane polymer foam consisting essentially of the resin produced by the catalytic reaction in the presence of a blowing agent of the quasi-prepolymer claimed in claim 2 and a compound having a plurality of active hydrogen atoms as determined by the Zerewitnoff test.

8. A urethane polymer foam consisting essentially of the resin produced by the catalytic reaction in the presence of a blowing agent of the quasi-prepolymer as claimed in claim 3 and a compound having a plurality of active hydrogen atoms as determined by the Zerewitnoff test.

9. A urethane polymer foam consisting essentially of the resin produced by the catalytic reaction in the presence of a blowing agent of the quasi-prepolymer claimed in claim 4 and a compound having a plurality of active hydrogen atoms as determined by the Zerewitnoff test.

10. A urethane polymer foam consisting essentially of the resin produced by the catalytic reaction in the presence of a blowing agent of the quasi-prepolymer claimed in claim 5 and a compound having a plurality of active hydrogen atoms as determined by the Zerewitnoff test.

References Cited

UNITED STATES PATENTS

| | | | |
|---|---|---|---|
| 2,945,875 | 7/1960 | Tazuma | 260—453 |
| 3,156,659 | 11/1964 | Robitschek | 260—2.5 |
| 3,214,392 | 10/1965 | Worsley | 260—2.5 |
| 3,275,606 | 9/1966 | Kajawa et al. | 260—75 |

DONALD E. CZAJA, Primary Examiner

H. S. COCKERAM, Assistant Examiner

U.S. Cl. X.R.

156—77; 161—159; 260—77.5